United States Patent [19]
Heinrich et al.

[11] Patent Number: 4,725,152
[45] Date of Patent: Feb. 16, 1988

[54] ADJUSTABLE SHAFT SUPPORT, AND TAPE RECORDER WITH SUCH A SUPPORT

[75] Inventors: Norbert Heinrich; Johann Veigl, both of Vienna, Austria

[73] Assignee: U.S. Philips Corporation, New York, N.Y.

[21] Appl. No.: 924,545

[22] Filed: Oct. 29, 1986

[30] Foreign Application Priority Data
May 20, 1986 [AT] Austria .................................. 1327/86

[51] Int. Cl.⁴ .................. F16C 23/10; F16C 17/12; B65H 16/10; G11B 15/28
[52] U.S. Cl. .................................. 384/247; 226/187; 242/209; 384/229; 384/255
[58] Field of Search ............... 384/226, 229, 247, 252, 384/253, 255; 242/209, 206; 226/187, 186, 181

[56] References Cited

U.S. PATENT DOCUMENTS

| | | | |
|---|---|---|---|
| 1,972,840 | 9/1934 | Graf | 384/255 X |
| 2,068,679 | 1/1937 | Hokansson | 384/255 X |
| 2,609,254 | 9/1952 | Harris | 384/229 |
| 2,711,935 | 6/1955 | Miles | 384/255 |
| 3,359,843 | 12/1967 | Mead | 384/255 X |
| 3,529,790 | 9/1970 | Buch | 384/255 X |
| 3,866,946 | 2/1975 | Robison | 384/255 X |
| 3,949,919 | 4/1976 | Takei | 242/206 X |
| 4,231,504 | 11/1980 | Ketzer | 242/206 X |

FOREIGN PATENT DOCUMENTS
1140737 12/1962 Fed. Rep. of Germany .

*Primary Examiner*—Stuart S. Levy
*Assistant Examiner*—Thomas R. Hannon
*Attorney, Agent, or Firm*—David R. Treacy

[57] ABSTRACT

A capstan or pressure roller shaft is journalled in a single one-piece elongated bearing member having a bearing surface sufficient to define radial position and inclination of the shaft. The bearing member is aligned with respect to a mounting support on the tape recorder, to adjust shaft alignment, by two axially spaced cylindrical positioning surfaces which are received in axially spaced cylindrical receiving surfaces in the support. At least one of the positioning surfaces is eccentric with respect to the bearing member, and is fixed to the bearing member so that rotation of the bearing member about an axis defined by the receiving surfaces adjusts the inclination of the shaft. The shaft inclination may be adjusted by inserting a tool into the tape recorder, engaging a journal formed in a mounting support adjacent the bearing member, the tool having a gear which engages a toothed portion on the bearing member for rotating the bearing member about the support axis defined by the support receiving surfaces.

7 Claims, 3 Drawing Figures

ADJUSTABLE SHAFT SUPPORT, AND TAPE RECORDER WITH SUCH A SUPPORT

BACKGROUND OF THE INVENTION

The invention relates to a recording and/or reproducing apparatus for a record carrier in the form of a tape, hereinafter referred to as a tape recorder. A typical tape drive mechanism for such a recorder includes a mounting support, a cylindrical drive member which is coaxially connected to a shaft for driving the record carrier, and a radial bearing means for radially supporting the shaft on the mounting support. To permit adjusting the inclination of the shaft and the drive member relative to the record carrier, the radial bearing means comprises a radial bearing which is adjustable relative to the mounting support in a direction transverse to the shaft. This bearing is connected to a positioning sleeve surface which is disposed eccentrically relative to the shaft for positioning the adjustable radial bearing. At its circumference the sleeve is at least partly surrounded by the mounting support to allow its rotation.

In a known apparatus of this type which is commercially available, the shaft is prolonged to act as a capstan for the record carrier. The radial-bearing means for radially supporting the shaft includes the radial bearing which is adjustable relative to the part of the chassis of the apparatus which forms the support, and a further radial bearing. The further bearing is spaced from the adjustable bearing in the direction of the shaft and is arranged on a further part of the chassis. Thus, in the known apparatus the radial bearing means comprise two radial bearings which are spaced from each other and which are arranged independently of each other on two chassis parts. This design results in an intricate construction, requires a substantial amount of assembly work, and is a disadvantage in view of the space occupied in the axial direction of the shaft.

From German Auslegeschrift 11 40 737 it is known to rotatably support a shaft, which is prolonged to form a capstan for the record carrier, by means of only one radial bearing which is adjustable relative to the mounting support constituted by a magnetic-head support. However, the adjusting means for adjusting the inclination of the shaft is formed by three set-screws ehich each act on an annular flange of the radial bearing against the force of a cup spring. Thus this assembly has a comparatively large number of parts, and adjustment of the shaft inclination by means of the three set screws is an operation which requires comparatively much work and time.

SUMMARY OF THE INVENTION

An object of the invention is to simplify the construction and assembly of the capstan bearing and positioning elements.

Another object is to reduce the axial length of the bearing and positioning elements.

A further object is to ensure a correct and simple adjustment of the inclination of the shaft and hence of the drive member. In accordance with the invention, the radial-bearing means for radially supporting the shaft comprise only a single elongated adjustable radial bearing. For adjusting the inclination of the shaft and the drive member the adjustable bearing is connected to a further positioning surface which is axially spaced from and disposed eccentrically relative to the first positioning surface, and is at least partly surrounded by the mounting support to allow it to be rotated. Since the radial-bearing means for radially supporting the shaft has only one elongated adjustable radial bearing, the construction is very simple and compact and requires less assembly work.

By connecting this adjustable radial bearing to the two axially spaced positioning surfaces whih are disposed eccentrically relative to each other, a correct adjustment of the inclination of the shaft and hence of the drive member is achieved by means of a very simple construction. Adjusting the inclination is possible with a very simple adjustment process, which only requires the elements having the positioning surfaces to be rotated. Because of eccentric arrangement of the two positioning surfaces relative to each other, the adjustable radial bearing together with the shaft perform a pivotal movement by means of which the inclination of the shaft and the drive member connected thereto is adjusted.

Such an adjustment of the inclination of the drive member, which may be a capstan for the record carrier or a pressure roller which cooperates with a capstan, is necessary because, as is known, the drive member should be accurately aligned occupy such a spatial position relative to the road carrier. More particularly, the force exerted on the record carrier by this drive member should be directed such that during its transport the record carrier always moves exactly in a predetermined direction and is constantly moved past the record-carrier scanning means in the same relative position. This alignment is essential for a correct recording and/or reproducing process in such equipment. In contrast with the device described in the '747 Auslegeschrift, the inventive construction for adjusting the inclination of the shaft and hence of the drive member is comparatively simple and adjustment of this inclination can be effected very simply.

The further positioning sleeve may be arranged eccentrically on a further sleeve relative to the shaft, in which case both positioning sleeves, which are disposed eccentrically relative to each other, are also disposed eccentrically relative to the shaft. This is an advantage in order to obtain a large adjustment range for the inclination adjustment, but it slightly complicates the manufacture of the adjustable radial bearing connected to the positioning sleeves. Thus in a preferred simple embodiment it is found to be advantageous if the further positioning cylindrical surface is coaxial with the shaft. In practice this provides an adequate adjustment range for the inclination adjustment and at the same time it enables a simple manufacture of the adjustable radial bearing, connected to the positioning surfaces, to be obtained.

In this respect it is found to be very advantageous if the adjustable radial bearing comprises a bearing member receiving the shaft, the positioning sleeve which is coaxial with the shaft being provided on the circumferential surface of the member, and the further surface being formed on an element which is non-rotatably mounted on that member. In this way it is ahieved that the bearing member of the adjustable radial bearing is of a perfectly rotationally symmetrical construction and can therefore be manufactured simply, the sleeve whose circumferential surface forms the eccentric positioning sleeve being simply mounted onto that member so that all in all the adjustable radial bearing connected to the two positioning sleeves can be manufactured in a very favourable manner.

Rotating the positioning surfaces of the adjustable radial bearing in order to adjust the inclination of the shaft and the drive member may be effected, for example, manually without a tool after releasing a rotational locking means. Near one of its ends the adjustable radial bearing may comprise a hexagonal portion which can be rotated by means of a wrench, but in many cases this may give rise to problems because of a lack of space. Therefore, it is found to be very advantageous if the adjustable radial bearing comprises a toothed portion which is adapted to cooperate with a drivable adjustment gear wheel which serves as a tool for adjusting the radial bearing. In this way it is simple to rotate the positioning elements over any desired range for adjusting the adjustable radial bearing.

The adjustment gear wheel may be permanently mounted on the mounting support adjacent the adjustable radial bearing, in which case such an adjustment gear wheel should be provided in each apparatus. It is found to be advantageous if adjacent the adjustable radial bearing the mounting support ia formed with a bore for receiving a journal which projects from a first radial surface of the adjustment gear wheel, the adjustment gear wheel being detachable from the mounting support. An actuating projection which is coaxial with the journals projects from a second radial surface of the adjustment gear wheel for rotating this wheel. As a result of this, the mounting support for each apparatus need only be formed with a simple bore, which is an easy operation.

Two embodiments of the invention will be described in more detail, by way of example, with reference to the accompanying drawings.

DESCRIPTION OF THE PREFERRED EMBODIMENTS

The Tape Deck

Figure 1:
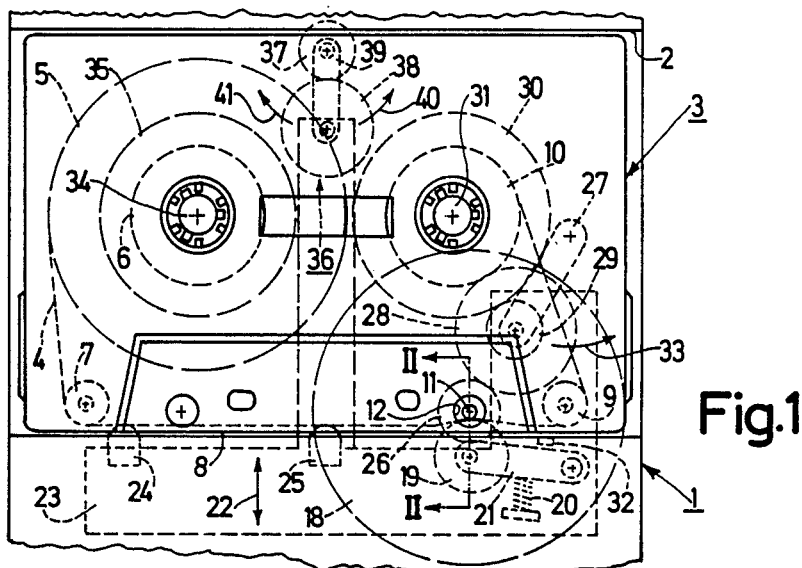
FIG. 1 is a substantially full-size schematic plan view of a part of a tape recorder having a capstan supported in an adjustable bearing according to the invention.

The recording and/or reproducing apparatus 1 shown in FIG. 1 has a receptacle which is adapted to receive a cassette 3 of a generally known construction. The cassette 3 contains a magnetizable record carrier 4 in the form of a tape, hereinafter briefly referred to as "magnetic tape". In the operating condition shown the magnetic tape 4 extends from a first reel hub 6 containing a full tape roll 5 to an empty second reel hub 10 over a first tape guide 7, along a narrow side 8 formed with openings for the passage of magnetic heads and a pressure roller, and over a second tape guide 9.

Figure 2:
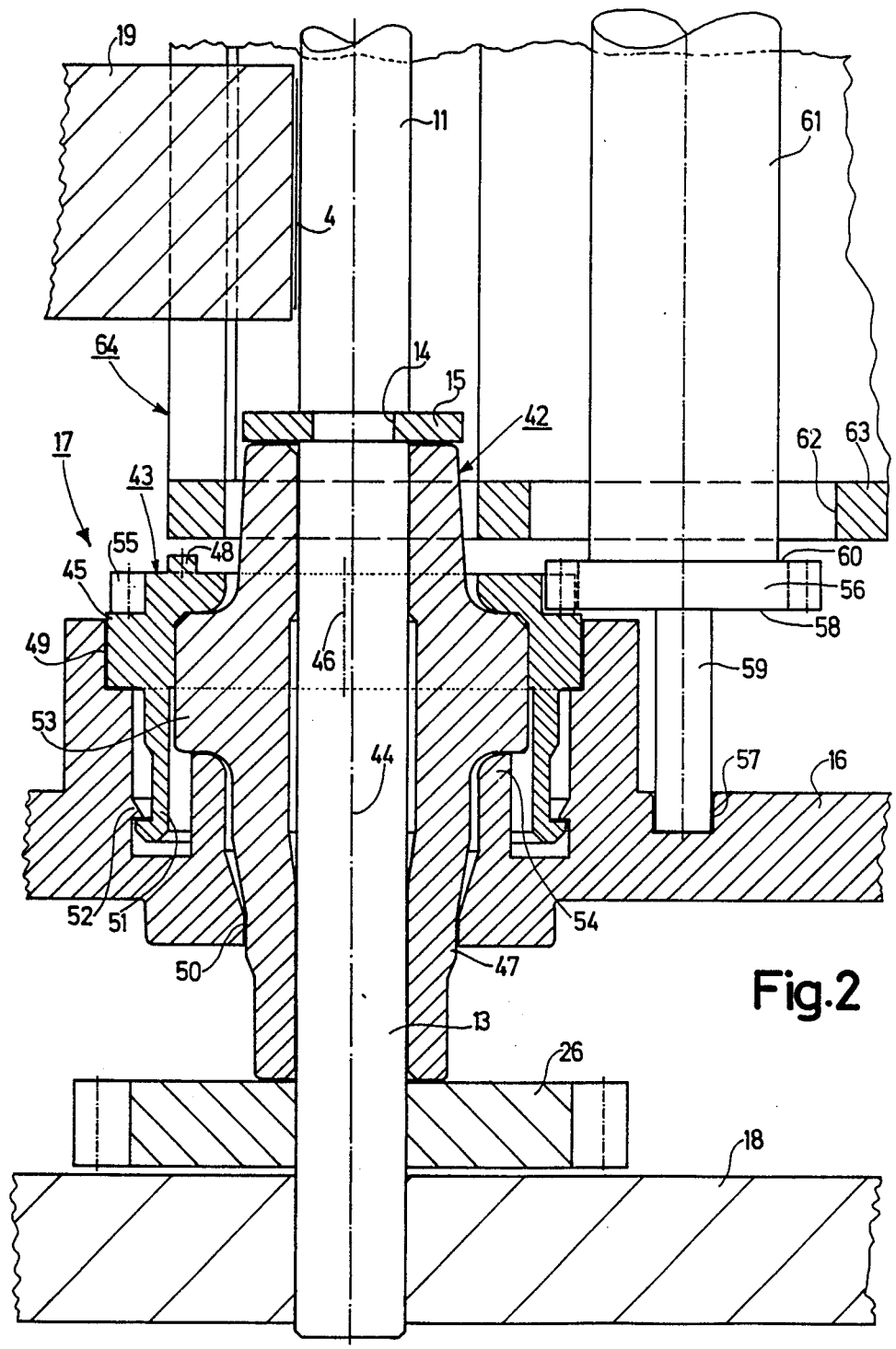
FIG. 2 is a sectional view taken on the line II—II in FIG. 1 and to an approximately ten times larger scale, showing the capstan of the apparatus of FIG. 1 and its bearing means in accordance with a first embodiment of the invention.

In order to drive the magnetic tape 4 during a normal recording or reproducing process, when the magnetic tape is driven with a constant speed in the customary manner, the apparatus 1 comprises a capstan 11 which is made of steel and which constitutes a cylindrical drive member for the magnetic tape 4. The capstan 11 extends into the cassette 2 through openings 12 in the two major walls of this cassette and engages behind the magnetic tape 4. As can be seen in FIG. 2, the capstan 11 is constituted by an extension of a shaft 13 that is, it is integral and coaxial with the shaft 13. A groove 14 is formed at the transition between the capstan 11 and the shaft 13 to fit a retaining ring 15 which axially supports the capstan 11 and the shaft 13. For radially supporting the shaft 13 on a plastic chassis 16 which serves as a mounting support, there is provided a radial bearing means 17 whose construction will be described in detail hereinafter. The shaft 13, which is coaxial with the capstan 11, carries a flywheel 18 which in a manner not shown can be driven with a constant speed by a motor, for example by a drive belt.

The apparatus 1 comprises a pressure roller 19 which is adapted to cooperate with the capstan 11 by pressing the magnetic tape 4 against the capstan 11 during normal recording or reproduction. The pressure roller 19 is pivotally mounted on a slide 23 which is movable in the direction indicated by the double arrow 22 by a lever 21 which is loaded by a spring 20. FIG. 1 shows the slide 23 in the position which it occupies during normal recording or reproduction, in which position the pressure roller 19 presses the magnetic tape 4 against the capstan 11, and a magnetic erase head 24 and a magnetic recording/play-back head 25 are in contact with the magnetic tape 4 through the openings in the narrow side wall 8 of the cassette 3.

The shaft 13 which is coaxial with the capstan 11 further carries a gear wheel 26 which is rotationally coupled thereto and which also axially supports the capstan 11 and the shaft 13. During a normal recording or reproduction process the gear wheel 26 is in mesh with an intermediate gear wheel 28 which is pivotally supported on the chassis 16 by means of a lever 27. The intermediate gear wheel 28 is coaxially and rotationally coupled to a further intermediate gear wheel 29 which meshes with a gear wheel 30 during a normal recording or reproducing process. Through friction clutch, not shown, the gear 30 drives a winding spindle 31 and the second reel hub 10. During normal recording or reproduction the shaft 13, which is coaxial with the capstan 11, thus drives the second reel hub 10 through the gear wheel 26, the two intermediate gear wheels 28 and 29, the gear wheel 30, the friction clutch and the spindle 31 to wind the magnetic tape 4, which is driven by the capstan 11 in conjunction with the pressure roller 19, onto the reel hub 10.

The slide 23 can be moved out of the operating position shown in FIG. 1 away from the cassette 3, in which case the magnetic heads 24 and 25 become disengaged from the magnetic tape 4, the pressure roller 19 is lifted off the capstan 11, and the lever 21 abuts against a stop 32 on the slide 23. Further, by means of a guide surface, not shown, on the slide 23 the intermediate gear wheels 28 and 29 are moved in the direction indicated by the arrow 33 by the slide 23 in such a way that the intermediate gear wheel 29 is no longer in mesh with the gear wheel 30. In the rest position of the slide 23, in which it has been moved away from the cassette 3, the magnetic tape 4 can be wound rapidly between the two reel hubs 6 and 10 in opposite directions of transport. The magnetic tape 4 is then driven in known manner between the reel hubs 6 and 10, the reel hub 6 cooperating with a winding spindle 34 and the reel hub 10 with the aforementioned winding spindle 31. By means of a friction clutch, not shown, the winding spindle 34 can be driven by a gear wheel 35 which is coaxial with this spindle.

For selectively driving the two gear wheels 35 and 30 which are coaxial withh the winding spindles 34 and 31 during fast winding, the apparatus 1 comprises a winding/drive mechanism 36. This mechanism comprises a first gear wheel 37 which is arranged on the chassis 16 and which can be rotated in opposite directions of rotation. The first gear wheel is in mesh with a second gear wheel 38 which is rotatably mounted on a lever 39 which is pivotable about the spindle of the first gear wheel 37. Depending on the direction of rotation of the first gear wheel 37 the second gear wheel 38 is pivoted in the direction indicated by an arrow 40 or 41, and meshes with one of the two gear wheels 30 or 35 in order to drive the spindles. It is to be noted that the second gear wheel 38 is latched in a neutral center position by means of a latching device arranged on the slide 23 when the slide 23 is in its operating position in which it has been moved towards the cassette, as is shown in FIG. 1. This ensures that fast winding is not possible during a normal recording or reproducing mode. When the slide 23 is in its rest position the latching device enables the second gear wheel 38 to be pivoted.

The Bearing Means

The radial bearing means 17 for the shaft 13 and the capstan 11 which is coaxial therewith will be described in more detail with reference to FIG. 2. The radial bearing means is of a very simple construction since it comprises only one elongated radial bearing 17 which is adjustable relative to the chassis 16 in a direction transverse to the shaft 13. This adjustable radial bearing 17 comprises a bearing member 42 of a sintered metal which receives the shaft 13, and a sleeve adjusting element 43 which is made of plastic material and which is mounted on the member 42. The bearing member 42 is elongated and, constructed as a double bearing having two bearing sections, one near each end portion of the member. Between the two bearing sections and member 42 is preferably clear of the shaft 13. Obviously, the member may comprise a single elongated bearing section which extends and surrounds the shaft 13 over the full axial length of the member. The sleeve member 43 is pressed onto the member 42 and is thus rotationally locked to the member. The sleeve member may also be connected to the member by means of an adhesive or in another way.

For adjusting the inclination of the shaft 13 and the capstan 11 relative to the magnetic tape 4, the adjustable radial bearing 17 is connected to a first positioning surface 45 of the sleeve 43, which is disposed eccentrically relative to the shaft 13 for positioning the adjustable radial bearing 17 transversely of the shaft 13; and a further positioning surface 47 formed on the member 42 and spaced from the first positioning surface 45 in the direction of the shaft 13, and disposed eccentrically relative to the surface 45 for positioning the adjustable radial bearing 17 transversely of the shaft 13. In FIG. 2 the axis of the shaft 13 is indicated by a dash-dot line 44 and the axis of the positioning surface 45 is indicated by a dash-dot line 46. In the present case the eccentricity is approximately 0.15 mm, which is found to be a suitable practical value for the present embodiment.

In order to obtain an indication of the eccentricity the adjustable radial bearing 17 has a cylindrical projection 48 which is formed on the sleeve member 43 and which serves as a marker. During mounting of the adjustable radial bearing 17 this projection 48 is brought into a predetermined position relative to the chassis 16, which position is defined by means of, for example, another marker. The two positioning surfaces 45 and 47 are both rotatably supported on the chassis 16. The first positioning surface 45 engages in a hollow cylindrical recess 49 and the second positioning element or surface 47 engages in a cylindrical hole 50 in the chassis 16. The two positioning surfaces fit in the chassis with such a friction that during normal operation the surfaces are locked against inadvertent rotation and consequently against an undesired adjustment of the adjustable radial bearing 17. In the present case the first positioning surface 45 which is disposed eccentrically relative to the shaft 13 is provided on the circumferential surface of the sleeve 43 and the second positioning surface 47, which is now simply coaxial with the shaft 13, is provided on the circumferential surface of the bearing member 42. In this way it is achieved that the member 42 is fully rotationally symmetrical and can thus be manufactured simply in the customary manner. Despite its rotationally asymmetrical shape the sleeve 43, which can be manufactured simply as a plastic part, can be pressed simply onto this rotationally symmetrical member 42, so that the adjustable radial bearing 17 can be manufactured very simply.

The sleeve 43 in which is pressed onto a portion 53 of the member 42, comprises a tubular portion 51 adjoining the positioning surface 45, which is disposed eccentrically relative to the shaft 13. The tubular portion 51 is formed with an axial slot, is coaxial with the shaft 13 and has offset resilient end portions which engage behind an annular projection 52 on the chassis 16 to retain the sleeve 43 with its positioning surface 45 in the recess 49. The member 42 with its portion 53 carrying the sleeve member 43 is axially supported on a seat formed on a hollow boss 54 of the chassis 16. It is to be noted that the shaft 13 is axially supported by the retaining ring 15 and the gear wheel 26, which bear against the member 42 at facing ends. Obviously, the shaft 13 may be axially supported in a different way, for example by means of a thrust bearing which cooperates with the free end portion of the shaft 13.

For adjusting the adjustable radial bearing 17 in order to adjust the inclination of the shaft 13 and the capstan 11 relative to the magnetic tape, the sleeve 43 comprises a toothed portion 55 which is coaxial with the first positioning surface 45 and which cooperates with an adjusting gear wheel 56 which can be rotated for adjusting the radial bearing 17. The toothed portion 55 extends over the entire circumference of the sleeve 43. However, alternatively it may be provided over only a part of its circumference.

In the chassis 16 adjacent the adjustable radial bearing 17 a bore 57 is formed for receiving a journal 59 which projects from a first radial surface 58 of the adjusting gear wheel 56. In this embodiment the adjusting gear wheel 56 is detachable from the chassis 16, and on its second radial surface 60 carriers an actuating projection 61 which is coaxial with the journal 59 for rotating the gear wheel 56. In this way a tool is obtained by means of which the inclination of the shaft 13 and the capstan 11 can be adjusted in a multitude of apparatuses. The apparatus itself is only formed with a bore in th chassis for rotatably supporting the adjusting gear wheel, which is a comparatively simple provision.

The actuating projection 61 can extend through an opening 62 in each major wall 63 of a test cassette 64. In principle, the test cassette 64 is of the same construction as the cassette 3 shown in FIG. 1, but it comprises additional means for observing and checking the transport of the magnetic tape past the magnetic heads 24 and 25 and the capstan 11 during transport of the magnetic tape. In the case of a manual adjustment of the inclination of the shaft 13 and the capstan 11 the actuating projection 61 is manually actuated. However, it can also be motor-driven, which is the case when the adjustment of the inclination is effected by means of a computer-controlled automatic adjusting device.

For mounting the capstan 11, the adjustable radial bearing 17 is simply inserted into the chassis 16 from the cassette side, in such a way that the projection 48 is in the predetermined position relative to the chassis 16, after which the capstan 11 is passed through the bearing member 42 from the opposite side, the shaft 13 is inserted into the bearing member 42, and finally the retaining ring 15 is fitted.

After mounting the bearing 17, it is necessary to adjust the inclination of the capstan 11. A test cassette 64 is inserted into the apparatus and the magnetic tape 4 of this cassette is driven in the same way as during normal recording or reproduction. The adjustment gear wheel 56 is inserted through the test cassette 64 until it meshes with the toothed portion 55, and the journal 59 engages the bore 57 in the chassis 16. In order to adjust the inclination of the capstan 11 the gear wheel 56 is rotated, so that the toothed portion 55 is driven and the two positioning surfaces are rotated relative to the chassis 16 against the friction between the surfaces 45 and 47 and the chassis. As a result of the eccentric position of the two positioning surfaces 45 and 47 relative to each other their rotation results in a pivotal movement of the adjustable radial bearing 17 substantially about the hole 50, causing the radial bearing 17 to be adjusted in a direction transverse to the shaft 13. During this pivotal movement the adjustable radial bearing 17 and the positioning surfaces 45 and 47 produce a deformation of the chassis 16 of the order of micrometers at the location of the recess 49 and hole 50. Obviously, this pivotal movement of the adjustable radial bearing 17 gives rise to a corresponding pivotal movement of the capstan 11, having two components. One component extends parallel to the plane of the magnetic tape 4 as shown in FIG. 2 and the other component extends perpendicularly to the plane of the magnetic tape 4 in FIG. 2. The first-mentioned component has a substantial influence on the correct transport of the magnetic tape past the magnetic heads. By a suitable adjustment of the inclination of the capstan 11 it should be selected in such a way that the magnetic tape 4 always moves past the magnetic heads 24 and 25 at the same level. The second component has hardly any effect on the transport of the magnetic tape in such apparatuses and may therefore be practically ignored.

In this embodiment adjusting the inclination of the capstan 11 by rotating the adjustment gear wheel 56 the is performed while the magnetic tape 4 is being driven by the capstan 11 until it is ascertained by means of the test set 64 that the desired tape transport past the magnetic heads 24 and 25 is obtained. The adjustment of the inclination of the capstan is effected by a very simple procedure, dynamically, which is very advantageous.

Once the adjustment of the inclination has been completed, the adjustment gear wheel 56 and subsequently the test cassette 64 are removed from the apparatus.

As is apparent from the foregoing description, the radial bearing means for the capstan is of a very simple construction, permits a reduced height of the apparatus, and requires no additional space.

Figure 3:
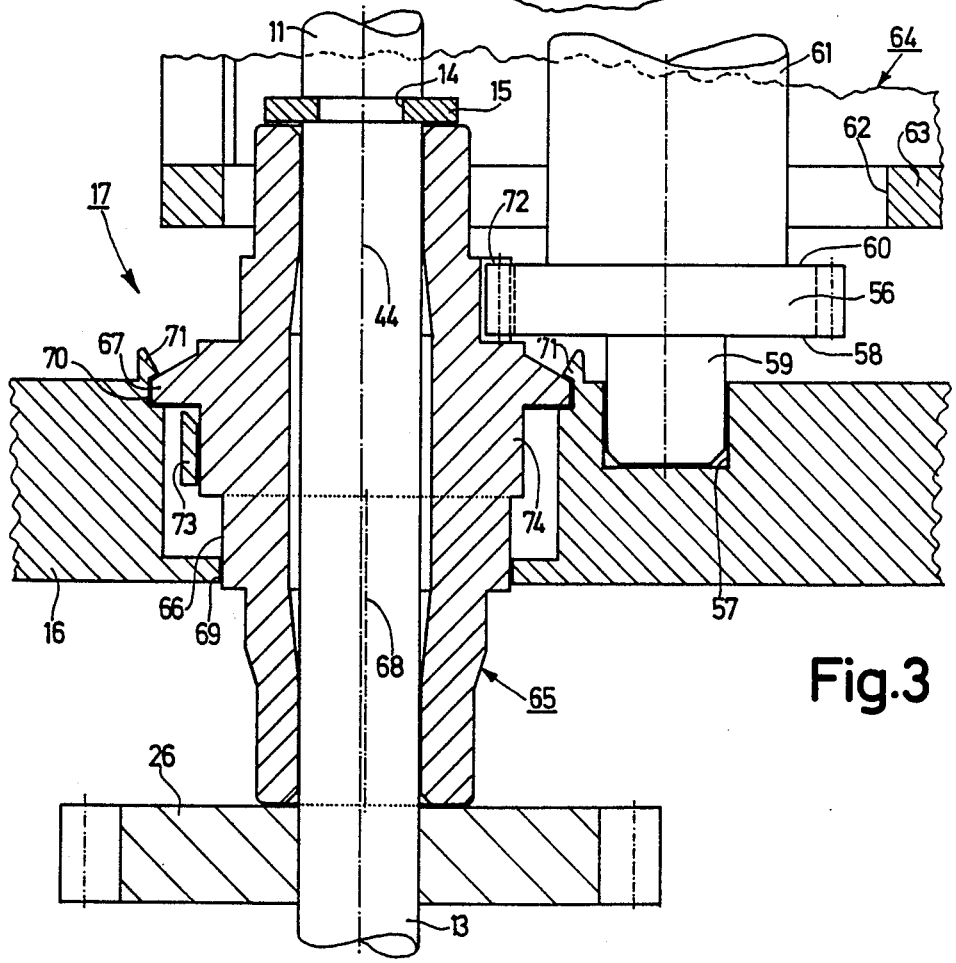
FIG. 3 is a view which is similar to that of FIG. 2 and which shows the capstan for the record carrier of a recording and/or reproducing apparatus and its bearing means in accordance with a second embodiment of the invention.

In the second embodiment shown in FIG. 3 the radial bearing means, as in the embodiment described above, comprises only one elongated adjustable radial bearing 17 having a member 65 which is integral with two positioning surfaces 66 and 67 which are disposed eccentrically relative to each other and which are spaced from each other in the axial direction of the shaft 13. The positioning surface 66, whose axis is indicated by a dash-dot line 68 in FIG. 3, is disposed eccentrically relative to the shaft 13, and the positioning surface 67 is coaxial with the shaft 13. In this bearing construction the eccentricity is approximately 0.07 mm, which is found to be a suitable practical value for the present embodiment.

The positioning surface 66 engages a bore 69 in the chassis 16 and the surface 67 fits in a recess 70 in the chassis 16. In order to retain the member 65 in chassis 16 comprises a plurality of clamping projections 71, two of which are visible in FIG. 3. For rotatating the two positioning sleeves 66 and 67 relative to the chassis 16, to adjust the member 65 for the purpose of adjusting the inclination of the capstan 11, the member 65 is formed with a toothed portion 72 which extends over a part of its circumference coaxial with the shaft 13. The portion 72 is engaged by a tool having a gear 56, which is detachable from the chassis 16. In order to lock the member 65 against inadvertent rotation, the chassis 16 carries a resilient latching projection 73 whose free end presses against the circumferential surface of a cylindrical portion 74 of the member 65. This circumferential surface has a plurality of narrow flat portions whose long sides extend in the axial direction of the shaft 13.

In the present embodiment the radial bearing means suitably comprises only the adjustable radial bearing. For adjusting the inclination of the capstan the two positioning are formed on the elongated bearing, and are simply rotated relative to the chassis, so that in the present case adjustment also proceeds very simply. During the adjustment of the inclination of the capstan the adjustable radial bearing is tilted substantially about the positioning surface situated nearest the cassette. Since the adjustable radial bearing is of a one-piece construction, the number of parts is minimized, its construction also enabling a minimal height of the apparatus.

Obviously, further modifications are possible within the scope of the present invention. For example, in accordance with the invention it is also possible to rotatably support a pressure roller which can cooperate which a capstan by means of only one adjustable radial bearing and to adjust the inclination of the roller relative to the record carrier, the mounting support being constituted by, for example, the lever on the slide. In the two embodiments described in the foregoing the bearing portions of the chassis in which the positioning surfaces are mounted for rotation have the same eccentricity as the positioning surfaces with which they cooperate. However, these bearing portions may alternatively have a smaller eccentricity than the positioning surfaces so as to minimise the influence of the tilting component which extends perpendicularly to the magnetic tape during adjustment of the inclination. Moreover, the two positioning surfaces of an adjustable radial bearing may also be disposed eccentrically relative to the shaft, which enables a larger adjustment range to be obtained. Two such positioning surfaces which are disposed eccentrically relative to the shaft may exhibit eccentricities in different radial directions. For rotatably supporting the positioning surfaces, sleeves may also be provided partly surrounded by the mounting support. Obviously, the invention may also be utilized in apparatuses in which the record carrier is not contained in a cassette but extends between two reels which can be mounted on the apparatus.

What is claimed is:

1. An apparatus comprising a mounting support, means for transporting an article in a given direction with respect to said support, a shaft arranged to cooperate with said article for affecting article travel in said direction, bearing means for radially supporting the shaft on the mounting support, and means for adjusting the inclination of the shaft relative to said article, characterized in that said bearing means consists of a single one-piece elongated bearing member having at least one radial bearing surface in which the shaft is journalled for rotation about a rotation axis, said at least one bearing surface defining a radial position and inclination of the shaft; first and second axially spaced cylindrical positioning surfaces defining an alignment axis, at least said first positioning surface being eccentric with respect to said rotation axis; and means for aligning said positioning surfaces to said member for rotation therewith about an axis defined by said positioning surfaces, said means for aligning including forming at least one of said positioning surfaces as a surface of said one piece bearing member, said mounting support has two axially spaced cylindrical receiving surfaces defining a support axis, said positioning surfaces each engaging a respective receiving surface for positioning each positioning surface coaxially with the respective receiving surface, and means for rotating said bearing member together with said positioning surfaces about said support axis, whereby rotation of said bearing member adjusts the inclination of said rotation axis with respect to said support axis.

2. An apparatus as claimed in claim 1, characterized in that said one of said positioning surfaces is coaxial with said rotation axis.

3. An apparatus as claimed in claim 2, characterized in that said means for rotating further comprises a toothed portion formed on said bearing means, arranged to be engageable by an adjustment gear on an adjusting tool, and a bore formed in said mounting support for receiving a journal on said tool, said journal being coaxial with said adjustment gear.

4. An apparatus as claimed in claim 1, characterized in that said means for rotating further comprises a toothed portion formed on said bearing means, arranged to be engageable by an adjustment gear on an adjusting tool, and a bore formed in said mounting support for receiving a journal on said tool, said journal being coaxial with said adjustment gear.

5. A tape recorder comprising a mounting support, means for transporting a tape in a given direction with respect to said support, a shaft arranged to cooperate with said tape for affecting tape travel in said direction, bearing means for radially supporting the shaft on the mounting support, and means for adjusting the inclination of the shaft relative to said tape, characterized in that said bearing means consists of a single one-piece elongated bearing member having at least one radial bearing surface in which the shaft is journalled for rotation about a rotation axis, said at least one bearing surface defining a radial position and inclination of the shaft; first and second axially spaced cylindrical positioning surfaces defining an alignment axis, formed on said one piece bearing member, said first positioning surface being eccentric with respect to said rotation axis, and said second positioning surface being coaxial with said rotation axis, said mounting support has two axially spaced cylindrical receiving surfaces defining a support axis, said positioning surfaces each engaging a respective receiving surface for positioning each positioning surface coaxially with the respective receiving surface, and means for rotating said bearing member together with said positioning surfaces about said support axis, whereby rotation of said bearing member adjusts the inclination of said rotation axis with respect to said support axis.

6. A recorder as claimed in claim 5, characterized in that said means for rotating further comprises a toothed portion formed on said bearing means, arranged to be engageable by an adjustment gear on an adjusting tool, and a bore formed in said mounting support for receiving a journal on said tool, said journal being coaxial with said alignment gear.

7. A tape recorder comprising a mounting support, means for transporting a tape in a given direction with respect to said support, a shaft arranged to cooperate with said tape for affecting tape travel in said direction, bearing means for radially supporting the shaft on the mounting support, and means for adjusting the inclination of the shaft relative to said tape, characterized in that said bearing means consists of a single one-piece elongated bearing member having at least one radial bearing surface in which the shaft is journalled for rotation, and a circular cylindrical mounting surface coaxial with said rotation axis; a sleeve having a circular cylindrical surface engaging said mounting surface, fixed to said bearing member, and having a first positioning surface formed thereon eccentric with respect to said rotation axis; said bearing member further having a second circular cylindrical positioning surface formed thereon coaxial with said rotation axis and axially spaced from said first surface, said mounting support has two axially spaced cylindrical receiving surfaces defining a support axis, said positioning surfaces each engaging a respective receiving surface for positioning each positioning surface coaxially with the respective receiving surface, means for rotating said bearing member together with said positioning surfaces about said support axis, whereby rotation of said bearing member adjusts the inclination of said rotation axis with respect to said support axis, and said means for rotating comprising a toothed portion formed on said bearing means, arranged to be engageable by an adjustment gear on an adjusting tool, and a bore formed in said mounting support for receiving a journal on said tool, said journal being coaxial with said adjustment gear.

* * * * *